3,344,130
BACTERIAL FERREDOXIN
Leonard E. Mortenson, Lafayette, Ind., assignor to E. I. du Pont de Nemours and Company, Wilmington, Del., a corporation of Delaware
No Drawing. Filed June 14, 1963, Ser. No. 287,775
4 Claims. (Cl. 260—115)

This application is a continuation-in-part of my co-pending application Ser. No. 178,552, filed Mar. 9, 1962, and now abandoned.

This invention relates to a novel catalytic material useful in oxidation-reduction reactions and more particularly to a proteinaceous anionic material useful in the catalytic reduction of nitrite ions to ammonia in aqueous solution.

In biological systems, reduction of selected groups takes place under mild conditions, i.e., in aqueous solution at normal temperature and pressure. Furthermore, there is considerable specificity or selectivity in such systems. In contrast to this, laboratory or industrial reduction-oxidation reactions generally require strenuous conditions. This is evident when comparison is made of the biological fixation of nitrogen with the conditions necessary for industry to obtain the same result. Considerable research has been conducted on catalysts from biological sources in order that the mechanism of such reactions can be understood and adapted for use in synthetic chemistry.

There has now been prepared a novel catalytic material capable of catalyzing the reduction of nitrite ions with hydrogen to ammonia in an aqueous solution of various enzymes, including the enzyme hydrogenase, under ordinary conditions of temperature and pressure, said catalytic material being obtained by (a) contacting an aqueous autolysate of anaerobic cells (i.e., extract from ruptured cells) with an organic amine-containing anion-exchange resin, (b) washing the absorbent with a buffer solution having a concentration of less than 0.1 molar of aqueous salt and a pH of 6 to 8, and (c) washing the adsorbent with an aqueous salt solution having an ionic strength at least equivalent to that of 0.1 molar potassium phosphate to dissolve the anionic component adsorbed thereon. Useful salts to form the aqueous salt solutions include the alkali metal and ammonium salts of such anions as halide (esp. chloride and bromide), sulfate, nitrate, carbonate, acetate, citrate and succinate. The resulting solution is then dialyzed to remove salts and obtain a purified product. Optionally the residual dialyzed solution can be concentrated by evaporation to remove water. To this novel catalytic product I have assigned the name "ferredoxin."

The novel oxidation-reduction catalyst obtained as herein described stimulates hydrogen gas formation from sodium pyruvate or from sodium dithionite in cell-free extracts of *Clostridium pasteurianum*. The substance also facilitates the enzymatic reduction of nitrite to ammonia. The new material contains carbon, hydrogen, oxygen, nitrogen, sulfur and iron. It is partly proteinaceous and has a molecular weight of between 5,000 and 20,000. It gives reversible color changes on oxidation and reduction and at both high (11–12) and low (1–2) pH. It is soluble in water and alcohol. This new material is not a discrete substance in natural sources, but rather it is a chemically derived fragment of various much more complex substances therein.

The following examples describe the preparation and properties of the catalytic composition of this invention.

EXAMPLE I

A. Growth of cells

Cultures of *Clostridium pasteurianum* (Wisconsin–5, see American Type Culture Collection–6013) were grown in a medium prepared as indiacted by the following table:

| | | |
|---|---|---|
| Distilled water | ml | 1000 |
| Sucrose | g | 20 |
| $MgSO_4 \cdot H_2O$ | g | 0.10 |
| NaCl | g | 0.10 |
| $Na_2MoO_4 \cdot 2H_2O$ | g | 0.01 |
| $KH_2PO_4$ | g | 0.50 |
| $K_2HPO_4$ | g | 0.50 |
| $CaCO_3$ | g | 10.0 |
| Biotin | µg | 1.0 |
| $FeCl_3 \cdot 6H_2O$ | g | 0.10 |

The culture medium above was maintained at 30° C. after inoculation with the cells. Nitrogen was bubbled under the liquid surface to provide both agitation and a source of nitrogen.

Culture growth was conveniently carried out in volumes of the medium between 1–40 liters employing a 2% inoculum in each case. After 16 hours' growth, optical density measured at 650 mµ in a colorimeter was 0.7–0.8. The pH of the culture (cell mixture) was between 5.4 and 5.8.

B. Isolation and drying of cells

Cells were concentrated after growth in the above medium by sedimentation in a centrifuge. In general, cells were washed by suspension in a small volume of buffer and centrifuged at a temperature of 5–10° C. with a force of 27,000×g. The buffer employed throughout this work was prepared by dissolving 6.8 g. of $KH_2PO_4$ in 400 ml. of distilled water, adjusting to pH of 6.8 with KOH, and diluting to 1 liter.

Ten liters of a culture was harvested in a continuous centrifuge with nitrogen pressure used to force the liquid from the culture vessel into the centrifuge bowl. The cell paste was washed with 500 ml. of buffer and recentrifuged. Distilled water (generally between 5–20 ml.) at 5° C. was added to thin the cell paste to produce a suspension of cells that could be poured into a 5 l. flask. The cells were dried by rotating the flask one-half hour under reduced pressure (0.25–0.5 mm.) in a water bath at 30–40° C. The flask was left under vacuum overnight without rotation to remove the last traces of water. The dried cells were stored under air or nitrogen at −15° C. in a sealed bottle. The yield of washed and dried cells averaged 6.3–7.5 g. from 10 liters of the original culture. The dried cells were stored in bottles sealed against moisture, for extended periods, as desired, at −15° C.

C. Preparation of cell extracts

One hundred sixty grams of dry cells were pulverized mechanically without exclusion of air and added to 1700 ml. of 0.15 M tris-(hydroxymethyl)amino-methane ("tris") buffer, pH 7.3 in a 2-liter suction flask. Since air was found to be deleterious after the autolysis, the suspension was purged with hydrogen. It was sealed with 0.8 atm. of hydrogen and placed on a rotary shaker at room temperature for 1 hour. The contents were poured into 500 ml. centrifuge cups and centrifuged at 33,000×g. for 20 minutes at 10° C. The resulting supernatant solution was cell-free.

D. *Isolation and partial purification of ferredoxin*

The operations described in the next two paragraphs were carried out at 5–10° C.

The supernatant from the autolysis of 320 g. of dried cells was stirred for 10 minutes in a beaker with 90 g. of diethylaminoethyl cellulose (DEAE cellulose), an anion exchange resin described by E. A. Peterson and H. A. Sober, J. Am. Chem. Soc., 78, 751 (1956), which had been equilibrated with 0.15 M tris buffer at pH 7.3. The ferredoxin was adsorbed on the DEAE cellulose while about 90% of the protein remained in solution. The suspension was filtered with suction. The filtrate contains various enzymes including hydrogenase and is designated as fraction 1 proteins. The filter cake of DEAE cellulose was washed thoroughly with three 1-liter portions of 0.15 M tris buffer. The washes were discarded. The ferredoxin was eluted from the DEAE cellulose by stirring with three portions of 450 ml. each of 0.15 M tris buffer containing sodium chloride (total $[Cl^-]=0.8$ N). The combined filtrates were dialyzed 3 hours in running tap water and then overnight in 16 liters of distilled water.

The solution was passed through a 4 x 20 cm. column of DEAE cellulose (equilibrated with 0.15 M tris buffer, pH 7.3). The ferredoxin was adsorbed as a brown band on the upper part of the column. The column was washed with 2 liters of 0.15 M tris buffer and then it was developed by the passage of about 2 liters of 0.15 M tris and sodium chloride solution (total $[Cl^-]=0.22$ N). After the ferredoxin band had moved nearly to the bottom of the column it was eluted with 0.15 M tris and sodium chloride solution ($[Cl^-]=0.28$ N). The eluate was dialyzed overnight against two changes of 6 liters each of distilled water.

The dialyzed column eluate was stirred in an ice bath while over a 1 hour period ammonium sulfate was added to 62% of saturation. The suspension was stirred for 30 minutes and then was filtered through a ⅛-inch bed of "Celite" diatomaceous earth. The filtrate was stirred in an ice bath while over a 30-minute period ammonium sulfate was added to 90% of saturation. The suspension was stirred for 30 minutes and was then centrifuged at 33,000×g. for 20 minutes at 10° C. The supernatant solution was discarded and the solid residues in the cups were dissolved in about 30 ml. of distilled water. The solution was dialyzed overnight against three changes of 6 liters of distilled water. The solution was stored for short periods of time at 5° C. or for longer periods at −20° C.

The quality of ferredoxin prepared by these procedures was measured in various ways as follows:

(1) In a typical batch, the iron content was 0.7–0.9 μmoles per mg. protein. The specific absorbance at 388 mμ was $K=3.75$ in the oxidized state (air).

(2) The fraction 1 proteins, which, unlike the parent preparation, no longer convert added sodium pyruvate to acetyl phosphate and hydrogen and carbon dioxide, regained this property substantially by additions of ferredoxin. Thus, when 5.0 mg. of fraction 1 protein in 1.0 ml. of solution was supplied with 22 mg. sodium pyruvate, the production of acetyl phosphate and hydrogen during 15 minutes was 70 μmole by the addition of 0.1 mg. ferredoxin.

The following table shows the yields and activities at different stages of purification, based on 320 g. of dried cells.

E. *Purification with aminoethyl cellulose*

Partially purified ferredoxin was further purified by chromatography on aminoethyl cellulose. This adsorbent was equilibrated with 1 M phosphate buffer ($pH=6.5$), loaded into a 2 x 19 cm. column using 5 p.s.i. of nitrogen pressure, and washed with water. A solution of ferredoxin was passed through the column. The adsorbed band of feredoxin was moved slowly down the column with 0.05 M phosphate buffer and eluted with 0.10 M phosphate buffer. Eight fractions of 50 ml. each were caught. The middle four were combined and dialyzed. The ferredoxin thus obtained was 1.3 times as active on a protein basis as that which was applied to the aminoethyl cellulose column, and 88% of the ferredoxin was recovered.

F. *Further purification with calcium phosphate gel-cellulose columns*

Partially purified ferredoxin was also purified by chromatography on a column of calcium phosphate gel and cellulose. The adsorbent was prepared by mixing 30 g. of wet $Ca_3(PO_4)_2$ gel (Nutritional Biochemicals Co.) and 20 g. of dry standards grade Whatman cellulose powder (W. & R. Ballston, Ltd.) with enough distilled water to make a slurry. This was passed into a column to form a bed 1.5 x 7 cm. and washed with distilled water. One hundred four mg. of ferredoxin in aqueous solution was passed through the column. The adsorbed material was eluted wtih cold distilled water. This ferredoxin was 1.2 times more active, on a protein basis, than the original material, but only 46% of the original ferredoxin was recovered.

G. *Crystallization of ferredoxin*

Ferredoxin obtained by ammonium sulfate fractionation or by one of the methods used for further purification was brought to a concentration of about 10 mg. per ml. Solid ammonium sulfate was added to 60% saturation, the pH was adjusted to 7.5 by addition of ammonium hydroxide, and the solution was allowed to stand at 5° C. for a few days until crystallization appeared complete. The crystals were collected by centrifugation and washed with 80% ammonium sulfate. By repetition of the above procedure ferredoxin can be recrystallized. Ferredoxin crystallizes under these conditions as light brown elongated platelets, sometimes forming rosettes.

(H.) *Analytical properties of ferredoxin*

1. IRON

For determination of total iron, a sample was digested with a mixture of perchloric and nitric acids. After reduction to the ferrous state with excess mercaptoacetic acid, the iron was determined colorimetrically by the method of K. Doeg and D. M. Ziegler, Arch. Biochem. Biophys., 97, 37–40 (1962).

Total iron found was 0.9 μ mole per mg. of ferredoxin.

2. LABILE SULFUR

Labile sulfur found by the method of Fogo and Popovsky Anal. Chem., 21, 732–734 (1949) was 0.9 μmole per mg.

3. SPECTRAL CHARACTERISTICS

The absorption spectrum of ferredoxin shows peaks at 388 mμ ($k=3.75$), 310 mμ ($k=4.67$), and 280 mμ ($k=4.70$). The spectrum has troughs [minima] at 355

| Stage | Ferredoxin (mg.) | Ferredoxin (percent yield) | Activity Ratio Ferredoxin/Protein (on mg. basis) | Ratio of Optical Density 388 mμ/280 mμ |
|---|---|---|---|---|
| Cell autolysate | 869 | 100 | 0.0063 | |
| DEAE batcheluate | 430 | 50 | 0.072 | 0.28 |
| DEAE column eluate | 256 | 30 | 0.69 | 0.65 |
| Ammonium sulfate fraction | 130 | 15 | 1 | 0.75 | and 257 mμ and rises rapidly at wave lengths below 250 mμ.

The spectrum of reduced ferredoxin (run one hour after reduction with excess potassium borohydride in aqueous solution in absence of air) shows a shallow peak at 285 mμ and a shallow trough at 278 mμ, and rises rapidly at wave lengths below 260 mμ.

The difference spectrum (oxidized minus reduced) shows maxima at 400–410 and 310–320 mμ; it shows minima at 560–700 mμ (broad) and at 345 mμ, and falls to very low values at wave lengths below 260 mμ.

The infrared spectra of ferredoxin show the following absorptions: a strong absorption at 3300 cm.$^{-1}$ with a shoulder at 3470, a medium band at 3090 and 2970, strong absorption at 1660 and 1537 with a shoulder at 1564, and medium absorption at 1456, 1408, and 1236. In the far infrared, absorption bands occur at 417 and 360.

4. MOLECULAR WEIGHT

Using the general procedure detailed by Schachman (Colowick and Kaplan, "Methods in Enzymology," Academic Press, N.Y., 1957, vol. IV, page 32 and following), the sedimentation behavoir in the ultracentrifuge gave a molecular weight of 12,926. The ferredoxin was in a 0.004 molar phosphate buffer at a pH of 6.9 and ionic strength of 0.05. The calculation of the molecular weight assumed a partial specific volume ($\bar{V}$) of 0.73 ml./g.

5. ELECTROPHORESIS

Ferredoxin when purified as described above migrates as an anion and is homogeneous when subjected to starch gel electrophoresis (0.02 M borate buffer, pH 8.6). Under these conditions as little as 3% of a foreign protein could have been detected.

6. AMINO ACID CONTENT

A sample of 4.702 mg. of solid ferredoxin was hydrolyzed by heating in a sealed tube with 5 ml. of 6 N hydrochloric acid for 22 hours at 110° C. The solution was evaporated to dryness in vacuo. The residue was dissolved in 5 ml. of water and the evaporation was repeated. The residue was dissolved in 5 ml. of citrate buffer (pH=3.25) and the solution was analyzed for amino acids by a Phoenix automatic analyzer. The results:

| Amino acid: | α mole |
|---|---|
| Aspartic acid | 2.75 |
| Threonine | 0.23 |
| Serine | 1.10 |
| Proline | 0.89 |
| Glutamic acid | 1.25 |
| Glycine | 1.24 |
| Alanine | 2.44 |
| Valine | 1.77 |
| Cystine (½) | 3.89 |
| Isoleucine | 1.50 |
| Tyrosine | 0.31 |
| Phenylalanine | 0.31 |
| Lysine | 0.31 |
| Ammonia | 3.80 |

7. MAGNETIC SUSCEPTIBILITY

Examination of dried ferredoxin for paramagnetic susceptibility by the Faraday method showed the material to be weakly paramagnetic.

8. EMISSION SPECTRUM

Emission spectrographic examination of purified ferredoxin showed the presence of iron in amounts of between 2–10% whereas the maximum amount of any other metal present did not exceed 0.15%.

9. ELECTRON PARAMAGNETIC RESONANCE PROPERTIES OF NITRIC OXIDE-FERREDOXIN COMPLEX

A solution of 0.8 cc. aqueous ferredoxin (3–6 mg. protein/ml., specific activity 100 to 275) and 0.2 cc. buffer (1.0 molar, pH 5.5 to 6.5, acetate or phosphate) was prepared under conditions excluding air. The flask containing the solution was attached to a vacuum system, evacuated, flushed with argon or hydrogen, evacuated, exposed to 1 atmosphere pressure of nitric oxide (10% to 30%) in argon, and closed and shaken for 30 minutes. The flask was then evacuated and filled with argon. A sample of the solution was placed in an EPR tube and kept frozen until examined in EPR spectrometer.

If an oxygen-free aqueous solution of oxidized or reduced ferredoxin at pH 5 to 9 is exposed to nitric oxide, the ferredoxin solution loses enzymatic activity progressively and develops a characteristic EPR spectrum at a g-value of 2.033. If observed in the frozen state at −150° C., an asymmetrical spectrum is detected; if observed in the liquid state at 25° C., a symmetrical signal of 14 gauss half-width is seen. The EPR signal intensity is proportional to ferredoxin concentration. The signal intensity is proportional to residual enzymatic activity of a given ferredoxin sample that is subjected to progressive thermal degradation.

A similar EPR spectrum is observed if an aqueous solution of a ferrous salt (ferrous sulphate or ferrous ammonium sulphate) is allowed to react with nitric oxide. Similarities of ferredoxin/NO and Fe(II)/NO EPR spectra are:
(a) g-value and line shape in liquid phase and
(b) spectral intensities enhanced and show characteristic hyperfine structure if anions such as phosphate or arsenate are added to solution.

Differences are that:
(a) Fe(II)/NO EPR line is narrower in liquid solution at room temperature.
(b) Time required for full reaction of ferredoxin with NO is about 10 times longer than for the Fe(II) sulfate, and
(c) Intensity of EPR of Fe(II)/NO complex decreases slowly in absence of air, or within a few minutes in air. Intensity of EPR signal of ferredoxin/NO complex was not appreciably decreased by flushing of the solution with argon for 8 hours, by dialysis for 24 hours, or by exposure to air at room temperature for 6 hours.

EXAMPLE II

To 500 ml. of a *C. pasteurianum* cell extract containing 18 g. of protein, 350 ml. of 2-propanol at −20° C. was added dropwise with rapid mixing by a magnetic stirrer. Approximately 98% of the protein was precipitated by this procedure. The amber-colored supernatant solution after being warmed to 5° C. was centrifuged at 20,000×g for 20 minutes to remove additional precipitate and then dialyzed overnight against 8 liters of cold water. Concentration of the solution from 850 ml. to about 50 ml. was achieved by dialysis against a polyethylene glycol of M.W. of 20,000. A yield of 200 mg. of solid containing ferredoxin was obtained.

EXAMPLE III

Another technique for preparing ferredoxin consisted in mixing 100 g. of dried cells of *C. pasteurianum* (see IB above) with 600 ml. of distilled water in a 2-liter suction flask and homogenizing the mixture by shaking it on a rotary shaker for 1 hour at 30° under hydrogen. The mixture then was heated at 100° C. for 45 minutes with the increased gas pressure resulting from expansion being released through a water trap. The mixture was cooled to 0° C. in an ice bath and centrifuged at 0° C. and 37,000×g for 20 minutes. The supernatant solution was then dialyzed for 24 hours against two changes of distilled water at 5° C. under anaerobic conditions. Any precipitate which formed was removed by centrifugation and the solution concentrated to 50–80 ml. by dialysis against the hygroscopic wax, polyethylene glycol of M.W. of 20,000. The resulting solution contained ferredoxin, equivalent to 0.1 to 0.18 g. of the product from ID, together with various contaminants that could be separated from it by alcohol extraction, or by fractional precipitation or absorption procedures as illustrated in Examples I and II.

EXAMPLE IV

A. Growth of cells

*Clostridium pasteurianum* ATCC 6013 was cultured on a medium containing

| | | |
|---|---|---:|
| Sucrose | g | 22.50 |
| $MgSO_4$ | g | 0.10 |
| NaCl | g | 0.10 |
| $KH_2PO_4$ | mg | 37.50 |
| $K_2HPO_4$ | mg | 37.50 |
| $Na_2MoO_4 \cdot 2H_2O$ | g | 0.01 |
| $MnSO_4 \cdot H_2O$ | g | 0.05 |
| Biotin | mg | 0.66 |
| p-Amino benzoic acid | mg | 0.66 |
| $FeCl_3$ | mg | 25.00 |
| Citric acid | mg | 25.00 |

Tap water to 1000 ml.

Cell growth was accomplished at 30° C. in a 250 gallon stainless steel fermentor containing 800 liters of the above medium. A 16 hour, 40 liter inoculum was used to start growth. Nitrogen was bubbled from below the liquid surface. Agitation was by a motor-driven stirrer. The pH was constantly monitored and maintained between pH 5.0 and 6.0 by automatic addition of saturated KOH solution. After 16 hours' incubation, optical density at 650 m$\mu$ was in the range of 0.6 to 0.8. The cells were harvested.

B. Isolation and drying of cells

Cells were concentrated and processed as described in Example IB except for the following changes:

(a) 800 liters of culture was harvested instead of 10,
(b) the dried cells were stored under nitrogen in a sealed bottle, and
(c) the yield of washed, dried cells averaged 800–1000 g. from 800 l. of original culture.

EXAMPLE V

Isolation of ferredoxin by sonic oscillaiton

One hundred grams of wet *C. pasteurianum* cell paste was resuspended in 200 ml. of cold distilled water. A Raytheon 10 kc. sonic oscillator with chamber temperature maintained at 2° C. was used to disrupt the suspended cells. Fifty ml. aliquots were sonicated for 10–25 minutes at output current setting of 1.0 amps. Unbroken cells and debris were removed by centrifugation at 51,000×g for 30 minutes. The precipitate was washed once with a small volume of water and the wash added to the cell-free extract.

Ferredoxin was then purified as described in Example ID. The yield was approximately twice that from the procedure starting with autolysis of dried cells (Example I).

This novel proteinaceous catalytic product can also be prepared by use of other organisms in place of *Clostridium pasteurianum*, for example, *Clostridium butyricum, Clostridium lactoacetophilum, Clostridium saccharobutylicum. Micrococcus lactilyticus, Butyrbacterium rettgeri*, Rumen micro-organism LC., and the like.

The new catalytic proteinaceous product obtained in the manner described above is not in chemical combination with cationic proteins and enzymes, as produced by natural methods. After removal from the latter materials, the catalytic material is yellow-brown in color.

The catalytic activity of this substance ferredoxin in its oxidized state is relatively stable during storage in aqueous solution over the range of pH 4 to pH 11 at room temperature. Although proteinaceous, ferredoxin is not inactivated for use as a catalyst by the proteolytic action of trypsin, chymotrypsin, bromelin, or ficin. Furthermore, the catalytic activity of this proteinaceous product is relatively stable to heat, being substantially unchanged after 30 minutes at 80° C.

The product of this invention is strongly adsorbed by anion-exchange resins.

Its use in oxidation-reduction reactions is shown by conversion of sodium pyruvate to acetyl phosphate, hydrogen and carbon dioxide as previously detailed. Other illustrations are the reduction of aqueous nitrite ions to ammonia by hydrogen, and the formation of hydrogen gas from aqueous dithionite solution as follows.

When 20 micromoles of sodium nitrite was added to 6 mg. of proteins from Fraction 1, Example ID, in 3 ml. of aqueous solution of 0.1 M phosphate buffer, pH 6.5, under an atmosphere of hydrogen and treated with 1 mg. of ferredoxin, there was produced in 30 minutes 1.3 micromoles of ammonia, and 4 micromoles of hydrogen was consumed. In the absence of ferredoxin, no reaction occurred. Increases in time or in the amount of protein (Fraction 1) resulted in increased amounts of ammonia produced. When 3 mg. of sodium dithionite was added to 4.8 mg. of protein from Fraction 1, Example ID, in 3 ml. aqueous solution of 0.1 M phosphate buffer, pH 6.5, under an atmosphere of argon and treated with a mg. of ferredoxin, there was produced in 10 minutes 180 microliters of hydrogen. Without added ferredoxin, there was substantially no reaction. Furthermore, the catalytic material of this invention can also be used to promote nitrogen fixation in appropriate bacterial extracts.

The proteinaceous catalytic substance (ferredoxin) of this invention can be used in its reduced state as an antioxidant or oxygen scavenger for the protection of foodstuffs and other similar oxygen-sensitive commodities. Reduced ferredoxin, being easily air-oxidized, has been found to stabilize air-sensitive protein solutions against air damage for extended periods. This novel substance (ferredoxin) can also be used as a pH indicator. It shows a reversible color change brown to green on being treated with base at pH 11.5–12, and it shows another reversible change brown to colorless on being treated with acid at pH 2–1.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing ferredoxin, a proteinaceous catalytic material, which comprises contacting an aqueous autolysate of anaerobic bacterial cells with an organic amine-containing anion-exchange resin, washing the adsorbent with a buffer solution having a concentration less than 0.1 molar of aqueous salt and a pH of 6 to 8, subsequently washing said adsorbent with an aqueous salt solution having an ionic strength at least equivalent to that of 0.1 molar potassium phosphate to dissolve the anionic component adsorbed thereon, and dialyzing the resulting solution, whereupon salts are removed and the desired proteinaceous catalytic material is obtained.

2. Process of claim 1 wherein the anaerobic bacterial cells employed are derived from a microorganism selected from the class consisting of *Clostridium pasteurianum, Clostridium butyricum, Clostridium lactoacetophilum, Clostridium saccharobutylicum, Micrococcus lactilyticus, Butyrbacterium rettgeri* and Rumen microorganism LC.

3. The product ferredoxin, a proteinaceous catalytic material prepared by the process which comprises contacting an aqueous autolysate of anaerobic bacterial cells with an organic amine-containing anion-exchange resin, washing the adsorbent with a buffer solution having a concentration less than 0.1 molar of aqueous salt and a pH of 6 to 8, subsequently washing said adsorbent with an aqueous salt solution having an ionic strength at least equivalent to that of 0.1 molar potassium phosphate to dissolve the anionic component adsorbed thereon, and dialyzing the resulting solution, whereupon salts are removed and the desired proteinaceous catalytic material is obtained.

4. The product of claim 3 wherein the anaerobic bacterial cells are *Clostridium pasteurianum* cells.

References Cited
UNITED STATES PATENTS
3,236,741    2/1966    Carnahan et al. _____ 195—50

OTHER REFERENCES
Tozzola, Chem. Abst., vol. 49, p. 6374 (1955).
Barkulis, Chem. Abst., vol. 47, p. 10062 (1953).
Gest, Chem.-Abst., vol. 50, p. 1125 (1956).
Nicholas, Chem. Abst., vol. 54, pp. 25040–41 (1960).

Carnahan et al., Biochimica et Bisophysica acta 38, 1960 pp. 188–9.

Peterson, Jour. of the Amer. Chem. Soc., vol. 78, pp. 751–763.

Alexander, Analytical Method of Protein Chem., chapters 1 and 3. Chapter 1, pp. 6–8, 11–12, 14—chapter 3, pp. 70–72.

Journ. of Biol. Chem. 238, pp. 794–800 (1963) Mortenson et al.

Biochemical and Biophysical Research Communications, vol. 16, No. 5, p. 426, Tanaka et al.

Biophysical Chemistry, Edsall et al., 1958, pp. 80–81.

SAMUEL H. BLECH, *Primary Examiner.*

WILLIAM H. SHORT, *Examiner.*

H. SCHAIN, *Assistant Examiner.*